Patented Feb. 12, 1924.

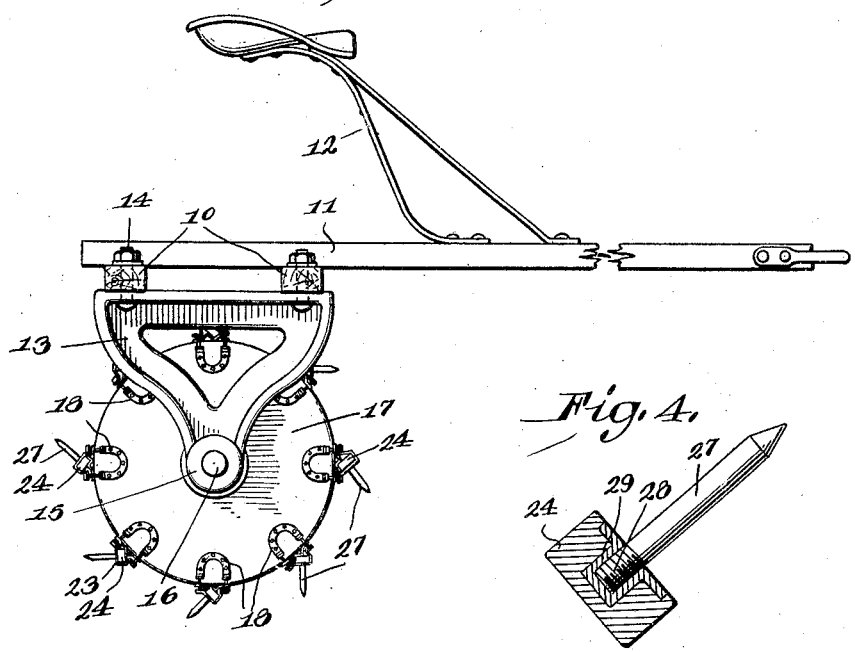

1,483,789

UNITED STATES PATENT OFFICE.

WILLIAM A. EARHART, OF EAST RADFORD, VIRGINIA.

ROTARY CULTIVATOR.

Application filed April 25, 1922. Serial No. 556,379.

*To all whom it may concern:*

Be it known that I, WILLIAM A. EARHART, a citizen of the United States, residing at East Radford, in the county of Montgomery and State of Virginia, have invented certain new and useful Improvements in Rotary Cultivators, of which the following is a specification.

The present invention relates to farming implements, particularly to those of the cultivator type.

An object of the invention is to provide a cultivator of the rotary type which may be easily and quickly converted into a roller and which has a plurality of angularly disposed teeth which may work up the soil during the rotation of the roller.

Another object of the invention is to provide an improved means for detachably securing the teeth to a peripheral surface of a roller, which means may be entirely removed when the teeth are removed to leave the surface of the roller free and unobstructed for operation.

A further object of the invention is to provide a tooth carrying bar and means for holding the bar against the side of the roller at the desired angle for maintaining the teeth of the bar at an inclination to the radius of the roller and to extend in the general direction of rotation of the roller.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a side elevation of a combined roller and cultivator constructed according to the present invention;

Fig. 2 is a fragmentary side elevation of the roller, showing the same made up in sections and having the cultivator teeth applied thereto;

Fig. 3 is a fragmentary enlarged end view of the roller showing the means for detachably holding the tooth bar upon the roller; and, Fig. 4 is an enlarged sectional view taken through the tooth bar, showing one of the teeth detachably mounted therein.

Referring to the drawings, 10 designates a frame which may be in the form of a pair of cross bars secured to a tongue 11, the tongue carrying a suitable seat 12. The cross bars 10 carry depending brackets 13 which are secured to the cross bars 10 by bolts 14 or the like and which have bearings 15 at their lower ends to receive a transverse shaft 16 upon which the roller of the device is mounted. As shown in Fig. 2, the roller may comprise a plurality of interchangeable and removable sections 17 which permit the building up of the roller into desired widths dependent upon the size of the frame, or implement, to be used.

The end of the roller 17 is provided with a plurality of brackets 18 of substantially U-shape which may be bolted or riveted as at 19 to the end of the roller and with the ends of the bracket extending outwardly toward the periphery of the roller and having outturned perforated ears 20 for the reception of bolts 21 therethrough, the bolts carrying nuts 22 adapted to be turned up against the inner sides of the ears 20. The bolts 21 are engaged through the ends of a strap 23 which is fitted over a cross bar 24, the strap 23 being bent to conform to the exterior configuration of the bar 24 so as to hold the same from turning axially within the strap after the latter is drawn taut.

The bar 24 is held against the periphery of the roller in a tilted position, as shown in Fig. 3, by a socket plate 25, the plate being apertured at its opposite ends for the reception of the bolts 21 therethrough and having an intermediate crimped portion forming a socket 26 into which the adjacent edge of the bar 24 is adapted to seat. As shown in Fig. 2, the socket plate 25 is relatively narrow and extends but a short distance over the peripheral surface of the roller and beneath the bar 24.

The plate projects endwise from the roller a distance sufficient to receive the bolts 21 therethrough, and the heads of the bolts engage against the endings of the strap 23 so as to draw the same taut over the bar 24 and bind the latter into the socket 26 so as to hold the plate 24 tightly against the peripheral edge of the roller. The bolts 21 thus not only bind the strap in position but also hold the plate 25 to the roller. As the bolts pass through the opposite ends of the plate, the latter cannot be dislodged by jar and vibration beneath the bar 24 and the latter is thus securely held in its tilted position.

If desired, any number of bars 24 may be used, and each bar may have a desired number of teeth 27 which project from the forwardly inclined flat side of the bar. The teeth 27, as shown in Fig. 4, have threaded inner ends 28 which detachably engage in preferably metal sockets 29 seated in the forwardly inclined face of the bar so as to protect the bar against splitting or breaking incident to the operation of the cultivator and to permit the ready removal of the teeth for replacement and for utilizing the desired number of teeth upon each bar.

When it is desired to use the device as a roller, the bolts 21 are removed from the brackets 18 and the bars 24 with their straps 23 and socket plates 25 are entirely removed from the roller so as to leave the surface of the roller free and uninterrupted and so as to leave no parts upon the roller which are liable to become loose or detached.

It is obvious that various changes and modifications may be made in the details of construction and design of the above specifically described embodiment of this invention without departing from the spirit thereof, such changes and modifications being restricted only by the scope of the appended claims.

It is further obvious that while my invention relates to rotary cultivators, and is shown for draft, the same may be operated by hand, animal, tractor, or any other method suitable for the particular needs as they occur.

What is claimed is:

1. A combined roller and cultivator comprising a roller, brackets carried upon the ends of the roller, a plurality of bars adapted to extend across the periphery of the roller, socket members in the bars, and clamping means engaging the bars of the socket members and detachably mounted on said brackets for binding the bars on the socket members against the roller.

2. In a combined roller and cultivator, a roller, bars adapted to extend across the periphery of the roller, socket plates for receiving the ends of the bars, straps for engagement about the bars, and clamping bolts detachably secured through the straps in the socket members and with said brackets for binding the bars in the socket members and binding the latter against the roller.

3. In a rotary cultivator, a roller, a plurality of bars engaging across the periphery of the roller, brackets mounted upon the ends of the roller and spaced inwardly from the peripheral edge thereof, socket plates fitting beneath the opposite ends of the bars and having angularly disposed sockets therein for receiving the inner edges of the bars to support the same in a tilted position, straps engaging over the end portions of the bars above said socket plates, and clamping bolts detachably engaging through the ends of the straps and plates and with said brackets for binding the bars in the sockets and the socket plates against the roller.

In testimony whereof I affix my signature.

WILLIAM A. EARHART.